United States Patent Office 3,594,407
Patented July 20, 1971

3,594,407
13,17-DIALKYL-19-NORPREGN-4-ENE,
3,20-DIONES
Daniel M. Teller, King of Prussia, George H. Douglas, Chester, and Herchel Smith, Delaware, Pa., assignors to American Home Products Corporation, New York, N.Y.
No Drawing. Continuation-in-part of application Ser. No. 614,410, Feb. 7, 1967. This application Apr. 3, 1969, Ser. No. 813,284
Int. Cl. C07c 169/08
U.S. Cl. 260—397.3
8 Claims

ABSTRACT OF THE DISCLOSURE

The compounds of the class of 13,17-dialkyl-18,19-dinorpregn-4-en-3,20-diones and 13,17,21,21,21-pentaalkyl-18,19-dinorpregn-4-en-3,20-diones are prepared and found to be hormonally useful.

This application is a continuation-in-part of parent application, Ser. No. 614,410, filed Feb. 7, 1967, now abandoned.

BACKGROUND OF THE INVENTION

This invention relates to the field of new physiologically active 13-alkylated 18,19-dinorpregn-4-en-3,20-dione compounds novel processes for their production and new intermediates useful in the preparation thereof.

SUMMARY OF INVENTION

More particularly, this invention relates to compounds of the Formulae I and II:

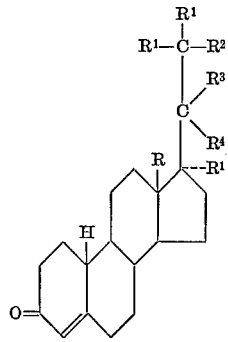

I and

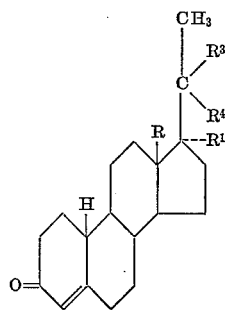

II wherein R represents an alkyl group of from 2 to 8 carbon atoms; $R^1$ represents an alkyl group of less than 5 carbon atoms; $R^2$ is selected from the group consisting of $R^1$ and hydrogen; $R^3$ represents hydrogen; and $R^4$ represents hydroxy, or together $R^3$ and $R^4$ represents oxo (=O).

The final products of this invention are physiologically active substances which are useful as androgen antagonists. It has also been found that the 13,17-dialkyl-18,19-dinorpregn-4-en-3,20-diones, shown below as Formula IXa have both oral and strong parenteral progestational and anti-estrogenic activity as determined under standard pharmacological procedures at different dosage levels from 10 to 1000$\mu$ in animals.

The compounds may be formulated for such administration, the concentration and/or dosage being based on the activity of the particular compound and the requirements of the patient.

The compounds of this invention may be prepared according to the process of this invention which may be represented by the following reaction scheme werein R, $R^1$, $R^2$, $R^3$, $R^4$, $R^5$ and $R^6$ are as hereinbefore defined:

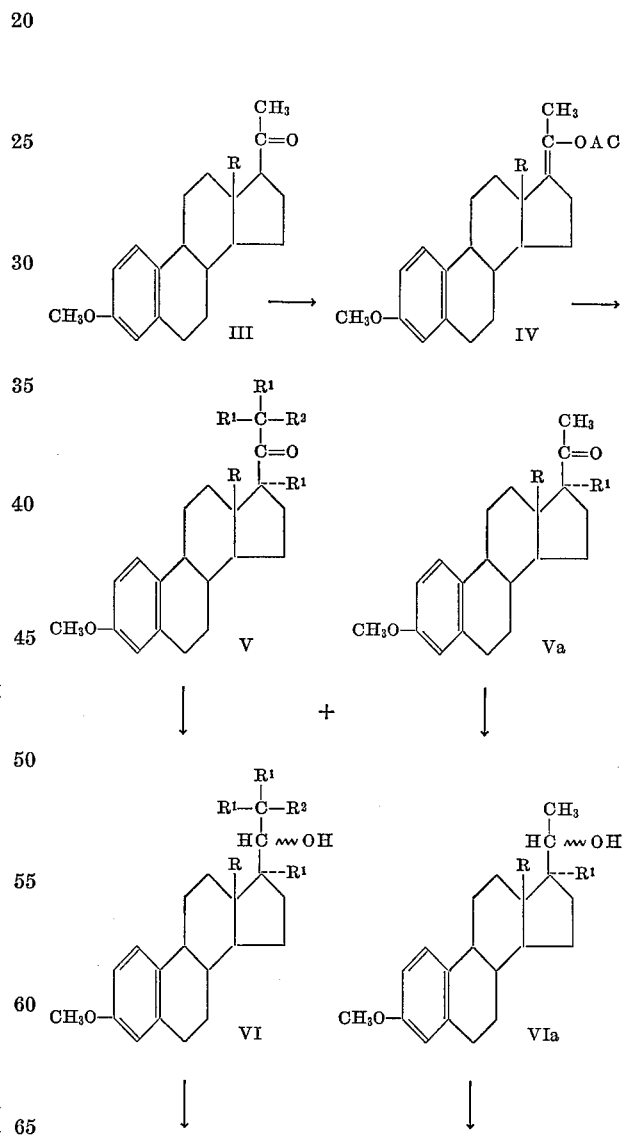

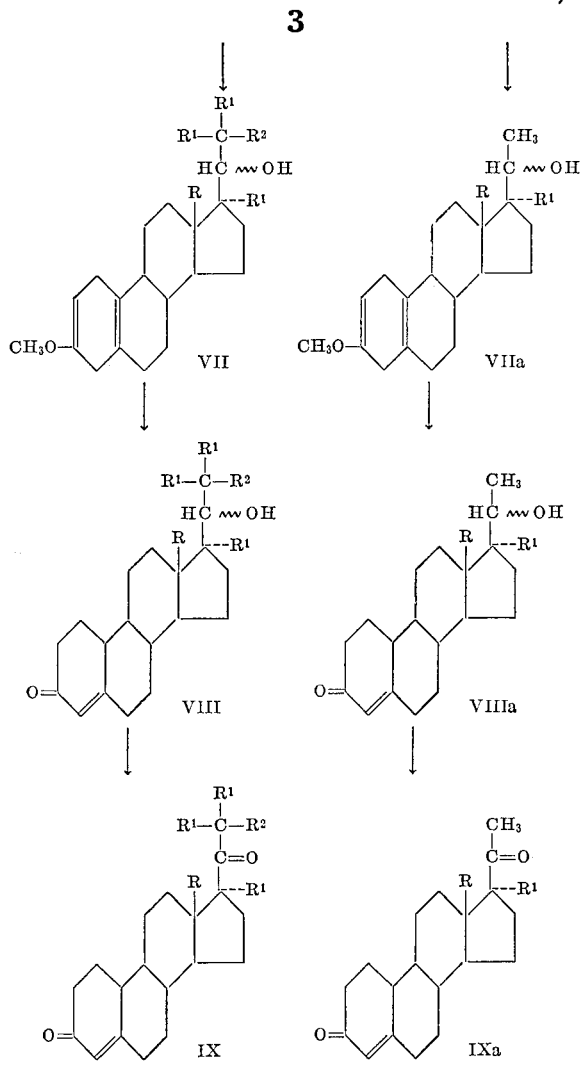

According to a feature of this invention, the 17β-acetyl-13-alkyl-3-methoxygona-1,3,5(10)-triene compound (III) is converted by a known process to the corresponding 3-methoxy-Δ$^{1,3,5(10),17(20)}$-20-enol-acetate (IV). Such process consists in reacting the 20-ketone steroids (III) with an acylating agent such as acetic anhydride, in the presence of a strongly acidic catalyst, such as p-toluenesulfonic acid, sulfuric acid or perchloric acid.

The compounds of Formula III are known compounds which may be prepared by any conventional method, such as described in copending application Ser. No. 534,353 of G. A. Huges et al. filed Mar. 15, 1966.

The 3-methoxy-Δ$^{1,3,5(10),17(20)}$-20-enol acetate compounds (IV) are then alkylated with an alkyl halide, such as methyl iodide, ethyl chloride, propyl chloride, butyl bromide, and the like, in liquid ammonia to yield the 3-methoxy-Δ$^{1,3,5(10)}$-17-alkyl-20-keto steroids of Formula Va and the novel 3-methoxy-Δ$^{1,3,5(10)}$-17,21,21,-trialkyl- or 17,21,21,21-tetra-alkyl-20-keto steroids of Formula V.

The 3-methoxy-Δ$^{1,3,5(10)}$-17-alkyl-21-polyalkylated-20-keto steroids of Formula V are then reduced with a reducing agent, such as sodium borohydride, to yield the corresponding 3-methoxy-Δ$^{1,3,5(10)}$-17-alkyl-21-polyalkylated-20-hydroxy steroids of Formula VI, which are further novel intermediates of the invention.

Subsequent reduction of the 3-methoxy-Δ$^{1,3,5(10)}$-17-alkyl-21-polyalkylated-20-hydroxy steroid (VI) in liquid ammonia with lithium and a lower alkanol yields the corresponding 3-methoxy-Δ$^{2,5(10)}$-17-alkyl-21-polyalkylated-20-hydroxy steroid (VII) which when treated with concentrated hydrochloric acid yields the novel 3-keto-Δ$^4$-17-alkyl-21-polyalkylated-20-hydroxy steroids (VIII).

Treatment of the 3-keto-Δ$^4$-17-alkyl-21-polyalkylated-20-hydroxy steroids (VIII) with an oxidizing agent such as Jones reagent (8 N CrO$_3$) yield the Δ$^4$-17-alkyl-21-polyalkylated-3,20-diketo steroids of Formula IX, which are novel final products of this invention.

Treatment of the 3-methoxy-Δ$^{1,3,5(10)}$-17-alkyl-20-keto steroids of Formula Va, similar to the process described for 21-polyalkylated compounds of Formula V, yields upon reduction with sodium borohydride the 3-methoxy-Δ$^{1,3,5(10)}$-17-alkyl-20-hydroxy steroids of Formula VIa. Further reduction of VIa in liquid ammonia with lithium and a lower alkanol yields the corresponding 3-methoxy-Δ$^{2,5(10)}$-17-alkyl-20-hydroxy steroids (VIIa) which, when treated with concentrated HCl which yields the 3-keto-Δ$^4$-20-hydroxy steroid of Formula VIIIa.

To obtain the 4,20-diketo steroids of Formula IXα, which are additional final products of this invention, the 3-keto-Δ$^4$-20-hydroxy steroids (VIIIa) are treated with an oxidizing agent, such as Jones reagent.

The following examples illustrate the invention (all temperatures being in centigrade):

EXAMPLE 1

13-ethyl-3-methoxy-18,19-dinorpregna-1,3,5(10),17(20)-tetraen-20-ol, acetate

A solution of 1.00 gm. of 17β-acetyl-13-ethyl-3-methoxygona-1,3,5(10)-triene and 0.53 gm. of p-toluenesulfonic acid in 100 ml. of acetic anhydride is slowly distilled through a short Vigreux column at atmospheric pressure over a 4 hour period leaving approximately 30 ml. of brown residue. The residue is cooled in an ice bath, 100 ml. of water is added and the mixture is stirred for 15 minutes. The mixture is then extracted with ether and the ether extracts washed with 10% aqueous sodium hydroxide, saturated aqueous sodium bicarbonate, water, dried over anhydrous magnesium sulfate and the solvent is evaporated in vacuo yields a brown gum. Column chromatography of the gum on 60 gm. of Florisil using 100% hexane as eluant gives, after recrystallization from methanol, 350 mg. of colorless solid which, on recrystallization from methanol, yields 13-ethyl-3-methoxy-18,19-dinorpregna-1,3,5(10),17(20)-tetraen-20-ol, acetate having a melting point of 89–92°;

$\lambda^{KBr}_{max.}$ 5.71, 5.88μ (weak); $\lambda^{EtOH}_{max.}$ 284 mμ (ε=1,660)

*Analysis.*—Calcd. for C$_{24}$H$_{32}$O$_3$ (percent): C, 78.22; H, 8.75. Found (percent): C, 78.22; H, 8.63.

EXAMPLE 2

13β-propyl-3-methoxy-18,19-dinorpregna-1,3,5(10),17(20)-tetraen-20-ol, acetate

Following the procedure of Example 1 but substituting 17β-acetyl-13β-propyl-3-methoxygona-1,3,5(10)-triene for 17β-acetyl-13-ethyl-3-methoxygona-1,3,5(10)-triene there is obtained 13β-propyl-3-methoxy-18,19-dinorpregna-1,3,5(10),17(20)-tetraen-20-ol, acetate.

EXAMPLE 3

13β-butyl-3-methoxxy-18,19-dinorpregna-1,3,5(10), 17(20)-tetraen-20-ol, acetate

Following the procedure of Example 1 but substituting 17β-acetyl-13β-butyl-3-methoxygona-1,3,5(10)-triene for 17β-acetyl-13-ethyl-3-methoxygona-1,3,5(10)-triene there is obtained 13β-butyl-3-methoxy-18,19-dinorpregna-1,3, 5(10),17(20)-tetraen-20-ol, acetate.

EXAMPLE 4

13β-isobutyl-3-methoxy-18,19-dinorpregna-1,3,5(10), 17(20)-tetraen-20-ol, acetate Following the procedure of Example 1 but substituting for 17β - acetyl-13β-isobutyl-3-methoxygona-1,3,5(10)-triene there is obtained 13β-isobutyl-3-methoxy-18,19-dinorpregna-1,3,5(10),17(20)-tetraen-2-ol, acetate.

EXAMPLE 5

13β-ethyl - 3 - methoxy-17,21,21-trimethyl - 18,19 - dinorpregna-1,3,5(10)-trien-20-one and 13β-ethyl-3-methoxy-17-methyl-18,19-dinorpregna-1,3,5(10)-trien-20-one To 4.0 gm. quantity of potassium dissolved in 2,000 ml. of liquid ammonia is added a few crystals of ferric nitrate to discharge the blue color. A solution of 9.90 gm. of 13β-ethyl-3-methoxy - 18,19 - dinorpregna-1,3,5(10), 17(20)-tetraen-20-ol, acetate in 600 ml. of distilled ether is then added over a 15 minute period and the mixture was stirred for 8 hours. 20.0 ml. of methyl iodide is added and after stirring 30 minutes another 10.0 ml. of methyl iodide is added. The mixture is stirred an additional 30 minutes and a further 10.0 ml. of methyl iodide is added. The mixture is then stirred 30 minutes and 20 ml. of 95% ethanol is added.

The ammonia is evaporated and water and benzene is added. The organic layer is washed with 5% aqueous hydrochloric acid, saturated aqueous sodium bicarbonate, water, dried over anhydrous sodium sulfate and the solvent is evaporated in vacuo. Crystallization of the gummy residue from isopropanol yields 4.60 g. of colorless solid.

The solid and mother liquor from the crystallization was combined and columned on Grade I Woelm neutral alumina. Elution with hexane and increasing proportions of benzene and recrystallization from isopropanol yields 0.75 gm. of 13β-ethyl-3-methoxy-17,21,21-trimethyl-18,19-dinorpregna-1,3,5(10)-trien-20-one having a melting point of 118–120°;

$\lambda_{max.}^{KBr}$ 5.94; $\lambda_{max.}^{EtOH}$ 283 mμ (ε=2,140)

*Analysis.*—Calcd. for $C_{25}H_{36}O_2$ (percent): C, 81.47; H, 9.85. Found (percent): C, 81.37; H, 9.57.

Later fractions from the column chromatography were recolumned on the same adsorbent. Elution with hexane containing increasing proportions of benzene gave 1.57 gm. of 13β-ethyl-3-methoxy-17-methyl-18,19-dinorpregna-1,3,5(10)-trien-20-one having a melting point of 144–148°;

$\lambda_{max.}^{KBr}$ 5.93μ; $\lambda_{max.}^{EtOH}$ 281 mμ (ε=2,070)

*Analysis.*—Calcd. for $C_{23}H_{32}O_2$ (percent): C, 81.13; H, 9.47. Found (percent): C, 81.46; H, 9.82.

EXAMPLE 6

13β-ethyl-3-methoxy-17,21,21,21-tetramethyl-18,19-dinorpregna-1,3,5(10)-trien-20-one Following the procedure of Example 5 there is also obtained in admixture, 13β-ethyl-3-methoxy-17,21,21,21-tetramethyl-18,19-dinorpregna-1,3,5(10)-trien-20-one.

EXAMPLE 7

13β - ethyl - methoxy - 17,21,21 - triethyl - 18,19 - dinorpregna - 1,3,5(10 - trien - 20 - one and 13β - ethyl - 3-methoxy - 17 - ethyl - 18,19 - dinorpregna - 1,3,5(10)-trien-20-one Following the procedure of Example 5, but substituting ethyl chloride for methyl iodide there is obtained 13β-ethyl - 3 - methoxy - 17,21,21 - triethyl - 18,19 - dinorpregna - 1,3,5(10) - trien - 20 - one and 13β - ethyl - 3-methoxy - 17 - ethyl - 18,19 - dinorpregna - 1,3,5(10)-trien-20-one.

EXAMPLE 8

13β - ethyl - 3 - methoxy - 17,21,21 - tributyl - 18,19 - dinorprenga - 1,3,5(10) - trien - 20 - one and 13β - ethyl-3 - methoxy - 17 - butyl - 18,19 - dinorpregna - 1,3,5 (10)-trien-20-one Following the procedure of Example 5, but substituting butyl bromide for methyl iodide there is obtained 13β-ethyl - 3 - methoxy - 17,21,21 - tributyl - 18,19 - dinorpregna - 1,3,5(10) - trien - 20 - one and 13β - ethyl - 3 - methoxy - 17 - butyl - 18,19 - dinorpregna - 1,3,5(10) - trien-20-one.

EXAMPLE 9

13β - propyl - 3 - methoxy - 17,21,21 - trimethyl - 18,19-dinorpregna - 1,3,5(10) - trien - 20 - one and 13β-propyl - 3 - methoxy - 17 - methyl - 18,19 - dinorpregna-1,3,5(10)-trien-20-one Following the procedure of Example 5, but substituting 13β - propyl - 3 - methoxy - 18,19 - dinorpregna - 1,3,5 (10),17(20)-tetraen-20-ol, acetate for 13β-ethyl-3-methoxy - 18,19 - dinorpregna - 1,3,5(10),17(20) - tetraen-20-ol, acetate there is obtained 13β-propyl-3-methoxy-17, 21,21 - trimethyl -1 8,19 - dinorpregna - 1,3,5(10) - trien-20 - one and 13β - propyl - 3 - methoxy - 17 - methyl-18,19-dinorpregna-1,3,5(10)-trien-20-one.

EXAMPLE 10

13β - butyl - 3 - methoxy - 17,21,21 - trimethyl - 18,19-dinorpregna - 1,3,5(10) - trien - 20 - one and 13β - butyl - 3 - methoxy - 17 - methyl - 18,19 - dinorpregna - 1,3, 5(10)-trien-20-one Following the procedure of Example 5, but substituting 13β - butyl - 3 - methoxy - 18,19 - dinorpregna - 1,3,5 (10),17(20)-tetraen-20-ol, acetate for 13β-ethyl-3-methoxy - 18,19 - dinorpregna- -1,3,5(10),17(20) - tetraen-20-ol, acetate there is obtained 13β-butyl-3-methoxy-17, 21,21 - trimethyl - 18,19 - dinorpregna - 1,3,5(10) - trien-20 - one and 13β - butyl - 3 - methoxy - 17 - methyl - 18, 19-dinorpregna-1,3,5(10)-trien-20-one.

EXAMPLE 11

13β - isobutyl - 3 - methoxy - 17,21,21 - trimethyl - 18,19-dinorpregna - 1,3,5(10) - trien - 20 - one and 13β - isobutyl - 3 - methoxy - 17 - methyl - 18,19 -dinorpregna-1,3,5(10)-trien-20-one Following the procedure of Example 5 but substituting 13β - isobutyl - 3 - methoxy - 18,19 - dinorpregna - 1,3,5 (10),17(20)-tetraen-20-ol, acetate for 13β-ethyl-3-methoxy - 18,19 - dinorpregna - 1,3,5(10),17(20) - tetraen-20-ol, acetate there is obtained 13β-isobutyl-3-methoxy-17,21, 21 - trimethyl - 18,19 - dinorpregna - 1,3,5(10) - trien - 20-one and 13β - isobutyl - 3 - methoxy - 17 - methyl - 18,19-dinorpregna-1,3,5(10)-trien-20-one.

EXAMPLE 12

13β-ethyl-3-methoxy-17-methyl-18,19-dinorpregna-1,3,5(10)-trien-20-ol

A suspension of 0.80 gm. of 13β-ethyl-3-methoxy-17-methyl - 18,19 - dinorpregna - 1,3,5(10) - trien - 20 - one and 1.60 gm. of sodium borohydride in 80 ml. of absolute ethanol is stirred at room temperature for 17 hours. Excess glacial acetic acid is added, ether is added, the solution is washed with water, saturated aqueous sodium bicarbonate, water, dried over anhydrous sodium sulfate and the solvent is evaporated in vacuo to yield 0.89 gm. of 13β - ethyl - 3 - methoxy - 17 - methyl - 18,19 - dinorpregna-1,3,5(10)-trien-20-ol.

EXAMPLE 13

13β-ethyl-3-methoxy-17,21,21-trimethyl-18,19-dinorpregna-1,3,5(10)-trien-20-ol

A suspension of 0.80 gm. of 13β-ethyl-3-methoxy-17, 21,21-trimethyl - 18,19 - dinorpregna - 1,3,5(10) - trien-20-one and 1.60 gm. of sodium borohydride in 80 ml. of absolute ethanol is stirred at room temperature for 17 hours. Excess glacial acetic acid is added, ether, is added, the solution is washed with water, saturated aqueous sodium bicarbonate, water, dried over anhydrous sodium sulfate and the solvent is evaporated in vacuo to yield 0.89 gm. of 13β-ethyl-3-methoxy-17,21,21-trimethyl-18,19-dinorpregna-1,3,5(10)-trien-20-ol.

Reduction of the products of Examples 6 through 11 according to the procedure of Example 13 gives, respectively, the products of the following Examples 14 through 24:

| Ex. No. | Ex. No. | Starting material Product | Product |
|---|---|---|---|
| 14 | 6 | 13β-ethyl-3-methoxy-17, 21, 21,21-tetramethyl-18,19-dinorpregna-1,3,5(10)-trien-20-one. | 13β-ethyl-3-methoxy-17, 21, 21,21-tetramethyl-18,19-dinorpregna-1,3,5(10)-trien-20-ol. |
| 15 | 7 | 13β-ethyl-3-methoxy-17,21, 21-triethyl-18,19-dinorpregna-1,3,5(10)-trien-20-one. | 13β-ethyl-3-methoxy-17,21, 21-triethyl-18,19-dinorpregna-1,3,5(10)-trien-20-ol. |
| 16 | 7 | 13β-ethyl-3-methoxy-17-ethyl-18,19-dinorpregna-1,3,5(10)-trien-20-one. | 13β-ethyl-3-methoxy-17-ethyl-18,19-dinorpregna-1,3,5(10)-trien-20-ol. |
| 17 | 8 | 13β-ethyl-3-methoxy-17, 21,21-tributyl-18,19-dinorpregna-1,3,5(10)-trien-20-one. | 13β-ethyl-3-methoxy-17, 21,21-tributyl-18,19-dinorpregna-1,3,5(10)-trien-20-ol. |
| 18 | 8 | 13β-ethyl-3-methoxy-17-butyl-18,19-dinorpregna-1,3,5(10)-trien-20-one. | 13β-ethyl-3-methoxy-17-butyl-18,19-dinorpregna-1,3,5(10)-trien-20-ol. |
| 19 | 9 | 13β-propyl-3-methoxy-17, 21,21-trimethyl-18,19-dinorpregna-1,3,5(10)-trien-20-one. | 13β-propyl-3-methoxy-17, 21,21-trimethyl-18,19-dinorpregna-1,3,5(10)-trien-20-ol. |
| 20 | 9 | 13β-propyl-3-methoxy-17-methyl-18,19-dinorpregna-1,3,5(10)-trien-20-one. | 13β-propyl-3-methoxy-17-methyl-18,19-dinorpregna-1,3,5(10)-trien-20-ol. |
| 21 | 10 | 13β-butyl-3-methoxy-17, 21,21-trimethyl-18,19-dinorpregna-1,3,5(10)-trien-20-one. | 13β-butyl-3-methoxy-17,21, 21-trimethyl-18,19-dinorpregna-1,3,5(10)-trien-20-ol. |
| 22 | 10 | 13β-butyl-3-methoxy-17-methyl-18,19-dinorpregna-1,3,5(10)-trien-20-one. | 13β-butyl-3-methoxy-17-methyl-18,19-dinorpregna-1,3,5(10)-trien-20-ol. |
| 23 | 11 | 13β-ethyl-3-methoxy-17, 21,21-trimethyl-18,19-dinorpregna-1,3,5(10)-trien-20-one. | 13β-isobutyl-3-methoxy-17, 21,21-trimethyl-18,19-dinorpregna-1,3,5(10)-trien-20-ol. |
| 24 | 11 | 13β-ethyl-3-methoxy-17-methyl-18,19-dinorpregna-1,3,5(10)-trien-20-one. | 13β-isobutyl-3-methoxy-17-methyl-18,19-dinorpregna-1,3,5(10)-trien-20-ol. |

EXAMPLE 25

13β-ethyl-3-methoxy-17-methyl-18,19-dinorpregna-2,5(10)-dien-20-ol 0.89 gm. of 13β-ethyl-3-methoxy-17-methyl-18,19-dinorpregna-1, 3,5(10)-trien-20-ol in 50 ml. of distilled tetrahydrofuran is added to 100 ml. of distilled liquid ammonia over a 1 minute period. Immediately 0.40 g. of lithium is added in small pieces as rapidly as possible. The mixture is stirred for 2 hours and then 20 ml. of absolute ethanol is added over 20 minutes. Warm water is added and the solution is extracted with ether-benzene. The organic layer is washed with saturated aqueous sodium bicarbonate, water, dried over anhydrous sodium sulfate and the solvent evaporated in vacuo to yield 0.87 gm. of 13-ethyl-13-methoxy-17-methyl-18,19-dinorpregna-2,5(10)-dien-20-ol as a colorless gum which crystallized on triturating with methanol. IR shows enol ether peaks at 5.89 and 6.00μ and no aromatic adsorption.

Treatment of the products of Examples 13 through 24 according to the procedure of Examples 25 gives, respectively, the products of the following Examples 26 through 37:

| Example No. | Starting material is product of Ex. No. | Product |
|---|---|---|
| 26 | 13 | 13β-ethyl-3-methoxy-17,21,21-trimethyl-18,19-dinorpregna-2,5(10)-dien-20-ol. |
| 27 | 14 | 13β-ethyl-3-methoxy-17,21,21,21-tetramethyl-18,19-dinorpregna-2,5(10''-dien-20-ol. |
| 28 | 15 | 13βethyl-3-methoxy-17,21,21-triethyl-18,19-dinorpregna-2,5(10)-dien-20-ol. |
| 29 | 16 | 13β-ethyl-3-methoxy-17-ethyl-18,19-dinorpregna-2(10)-dien-20-ol. |
| 30 | 17 | 13β-ethyl-3-methoxy-17,21,21-tributyl-18,19-dinorpregna-2,5(10)-dien-20-ol. |
| 31 | 18 | 13β-ethyl-3-methoxy-17-butyl-18,19-dinorpregna-2,5(10)-dien-20-ol. |
| 32 | 19 | 13β-propyl-3-methoxy-17,21,21-trimethyl-18,19-dinorpregna-2,5(10)-dien-20-ol. |
| 33 | 20 | 13β-propyl-3-methoxy-17-methyl-18,19-dinorpregna-2,5(10)-dien-20-ol. |
| 34 | 21 | 13β-butyl-3-methoxy-17,21,21-trimethyl-18,19-dinorpregna-2,5(10)-dien-ol. |
| 35 | 22 | 13β-butyl-3-methoxy-17-methyl-18,19-dinorpregna-2.5(10)-dien-20-ol. |
| 36 | 23 | 13β-isobutyl-3-methoxy-17,21,21-trimethyl-18,19-dinorpregna-2,5(10)-dien-20-ol. |
| 37 | 24 | 13β-isobutyl-3-methoxy-17-methyl-18,19-dinorpregna-2,5(10)-dien-20-ol. |

EXAMPLE 38

13β-ethyl-20-hydroxy-17-methyl-18,19-dinorpregn-4-en-3-one

A suspension of 0.77 gm. of 13β-ethyl-3-methoxy-17-methyl-18,19-dinorpregna-2,5(10)-dien-20-ol in 21.5 ml. of methanol, 1.46 ml. of concentrated hydrochloric acid and 0.92 ml. of water is stirred at room temperature for 1 hour. The mixture is then filtered and the filtrate is diluted with benzene, washed with saturated aqueous sodium bicarbonate, water, dried over anhydrous sodium sulfate and the solvent evaporated in vacuo to yield 0.77 gm. of 13b - ethyl-20-hydroxy-17-methyl-18,19-dinorpregn-4-en-3-one.

Treatment of the products of Examples 26 through 37 according to the procedure of Example 38 yields, respectively, the products of the following Examples 39 through 50.

| Example No. | Starting material is product of Ex. No. | Product |
|---|---|---|
| 39 | 26 | 13β-ethyl-20-hydroxy-17, 21, 21-trimethyl-18, 19-dinorpregn-4-en-3-one. |
| 40 | 27 | 13β-ethyl-20-hydroxy-17, 21, 21, 21-tetramethyl-18, 19-dinorpregn-4-en-3-one. |
| 41 | 28 | 13β-ethyl-20-hydroxy-17, 21, 21-triethyl-18,19-dinorpregn-4-en-3-one |
| 42 | 29 | 13β-ethyl-20-hydroxy-17-ethyl-18,19-dinorpregn-4-en-3-one. |
| 43 | 30 | 13β-ethyl-20-hydroxy-17,21,21-tributyl-18,19-dinorpregn-4-en-3-one. |
| 44 | 31 | 13β-ethyl-20-hydroxy-17-butyl-18,19-dinorpregn-4-en-3-one. |
| 45 | 32 | 13β-propyl-20-hydroxy-17,21,21-trimethyl-18,19-dinorpregn-4-en-3-one. |
| 46 | 33 | 13β-propyl-20-hydroxy-17-methyl-18,19-dinorpregn-4-en-3-one. |
| 47 | 34 | 13β-butyl-20-hydroxy-17, 21, 21-trimethyl-18,19-dinorpregn-4-en-3-one. |
| 48 | 35 | 13β-butyl-20-hydroxy-17-methyl-18,19-dinorpregn-4-en-3-one. |
| 49 | 36 | 13β-isobutyl-20-hydroxy-17,21,21-trimethyl-18,19-dinorpregn-4-en-3-one. |
| 50 | 37 | 13β-isobutyl-20-hydroxy-17-methyl-18,19-dinorpregn-4-en-3-one. |

EXAMPLE 51

13β-ethyl-17-methyl-18,19-dinorpregn-4-en-3,20-dione

To a solution of 0.30 gm. of 13-ethyl-20-hydroxy-17-methyl-18,19-dinorpregn-4-en-3-one in 32.0 ml. of acetone is added 1.6 ml. of 8 N $CrO_3$ (Jones reagent) at 0° all at once. Stirring at 0° is continued for 15 minutes, excess isopropyl alcohol is added, benzene is adedd and then the suspension is filtered. The filtrate is washed with saturated aqueous sodium bicarbonate, water, dried over anhydrous sodium sulfate and the solvent is removed by evaporation in vacuo to yield 0.27 gm. of a yellow solid. Recrystallization of the solid from ethyl acetate-hexane yields 0.14 gm. of 13β-ethyl-17-methyl-18,19-dinorpregn-4-en-3,20-dione having a melting point of 160–163°;

$\lambda_{max.}^{KBr}$ 5.89, 5.99, 6.18μ; $\lambda_{max.}^{EtOH}$ 242 mμ (ε=15,700)

*Analysis.*—Calcd. for $C_{22}H_{32}O_2$ (percent): C, 80.44; H, 9.83. Found (percent): C, 80.48; H, 10.17.

Oxidation of the products of Examples 39 through 50 according to the procedure of Example 51 yields, respectively, the products of the following Examples 52 through 63:

| Example No. | Starting material is product of Ex. No. | Product |
|---|---|---|
| 52 | 39 | 13β-ethyl-17,21,21-trimethyl-18,19-dinorpregn-4-en-3,20-dione. |
| 53 | 40 | 13β-ethyl-17,21,21,21-tetramethyl-18,19-dinorpregn-4-en-3,20-dione. |
| 54 | 41 | 13β-ethyl-17,21,21-triethyl-18,19-dinorpregn-4-en-3,20-dione. |
| 55 | 42 | 13β-ethyl-17-ethyl-18,19-dinopregn-4-en-3,20-dione. |
| 56 | 43 | 13β-ethyl-17,21,21-tributyl-18,19-dinorpregn-4-en-3,20-dione. |
| 57 | 44 | 13β-ethyl-17-butyl-18,19-dinorpregn-4-en-3,20-dione. |
| 58 | 45 | 13β-propyl-17,21,21-trimethyl-18,19-dinorpregn-4-en-3,20-dione. |
| 59 | 46 | 13β-propyl-17-methyl-18,19-dinorpregn-4-en-3,20-dione. |
| 60 | 47 | 13β-butyl-17,21,21-trimethyl-18,19-dinorpregn-4-en-3,20-dione. |
| 61 | 48 | 13β-butyl-17-methyl-18,19-dinorpregn-4-en-3,20-dione. |
| 62 | 49 | 13β-isobutyl-17,21,21-trimethyl-18,19-dinorpregn-4-en-3,20-dione. |
| 63 | 50 | 13β-isobutyl-17-methyl-18,19-dinorpregn-4-en-3,20-dione. |

It is understood that either *dl*-steroids or the specific *d*- or *l*-isomers may be employed as starting materials with like results.

The invention may be variously otherwise embodied within the scope of the appended claims.

What is claimed is:

1. A compound selected from the group consisting of those of the formulae

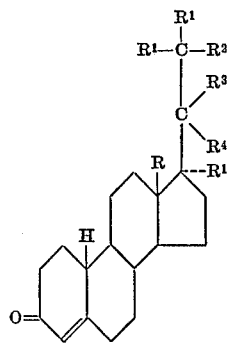

and

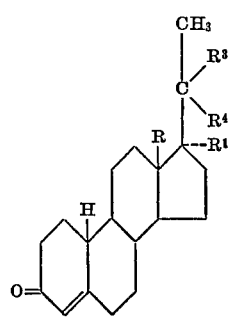

wherein R is an alkyl group having from 2 to 8 carbon atoms; $R^1$ is an alkyl group of less than 5 carbon atoms; $R^2$ is selected from the group consisting of $R^1$ and hydrogen; $R^3$ is hydrogen; $R^4$ is hydroxy; and together $R^3$ and $R^4$ is oxo (=O).

2. A compound according to claim 1 having the structural formula

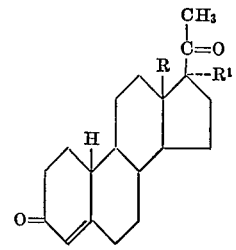

wherein R and $R^1$ are as hereinbefore defined.

3. A compound according to claim 2 that is 13β-ethyl-17-methyl-18,19-dinorpregn-4-en-3,20-dione.

4. A compound according to claim 1 that is 13β,17,21,21-tetraalkyl-18,19-dinorpregna-4-en-3,20-dione.

5. A compound according to claim 4 that is 13β-ethyl-17,21,21-trimethyl-18,19-dinorpregn-4-en-3,20-dione.

6. A compound according to claim 1 having the structural formula

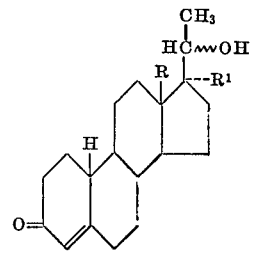

wherein R and $R^1$ are as hereinbefore defined.

7. A compound according to claim 6 which comprises 13β-ethyl-20-hydroxy-17-methyl-18,19-dinorpregn-4-en-3-one.

8. A process for preparing steroids having the D-ring structure

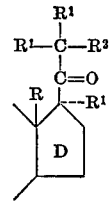

wherein R is an alkyl group having 2 to 8 carbon atoms; $R^1$ is an alkyl group of less than 5 carbon atoms; and $R^2$ is selected from the group consisting of hydrogen and alkyl of less than 5 carbon atoms which comprises reacting a steroid having the D-ring structure

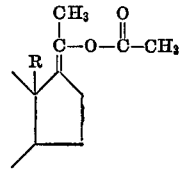

with at least two moles of an alkyl halide per mole of steroid.

References Cited

Journal of the Chemical Soc. (1965) by Jones et al., pp. 2936 and 2942 relied on.

Chemistry and Industry (1963) by Weiss et al., pp. 118–119 relied on.

ELBERT L. ROBERTS, Primary Examiner

U.S. Cl. X.R.

260—397.4, 397.5